(12) United States Patent
Yokoyama et al.

(10) Patent No.: US 11,886,781 B2
(45) Date of Patent: Jan. 30, 2024

(54) THREE-DIMENSIONAL SHAPE DATA GENERATION APPARATUS, THREE-DIMENSIONAL MODELING APPARATUS, AND NON-TRANSITORY COMPUTER READABLE MEDIUM STORING THREE-DIMENSIONAL SHAPE DATA GENERATION PROGRAM

(71) Applicant: FUJIFILM Business Innovation Corp., Tokyo (JP)

(72) Inventors: Yuki Yokoyama, Kanagawa (JP); Tomonari Takahashi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 486 days.

(21) Appl. No.: 16/740,490

(22) Filed: Jan. 13, 2020

(65) Prior Publication Data

US 2021/0046545 A1 Feb. 18, 2021

(30) Foreign Application Priority Data

Aug. 14, 2019 (JP) .................... 2019-148917

(51) Int. Cl.

| | | |
|---|---|---|
| *B29C 64/153* | (2017.01) | |
| *G06F 30/23* | (2020.01) | |
| *B29C 64/393* | (2017.01) | |
| *B29C 64/209* | (2017.01) | |
| *B29C 64/227* | (2017.01) | |
| *G06T 17/20* | (2006.01) | |
| *B22F 10/00* | (2021.01) | |
| *B22F 10/80* | (2021.01) | |

(Continued)

(52) U.S. Cl.
CPC .............. *G06F 30/23* (2020.01); *B22F 10/00* (2021.01); *B22F 10/80* (2021.01); *B29C 64/153* (2017.08); *B29C 64/209* (2017.08); *B29C 64/227* (2017.08); *B29C 64/393* (2017.08); *G06T 17/20* (2013.01); *B22F 10/18* (2021.01); *B22F 10/28* (2021.01); *B22F 12/55* (2021.01);

(Continued)

(58) Field of Classification Search
None
See application file for complete search history.

(56) References Cited

U.S. PATENT DOCUMENTS

2012/0224755 A1 9/2012 Wu
2015/0145177 A1* 5/2015 El-Siblani ........... B29C 35/0805
425/162

(Continued)

FOREIGN PATENT DOCUMENTS

JP 2007323254 12/2007
JP 2009126038 6/2009

(Continued)

OTHER PUBLICATIONS

"Notice of Reasons for Refusal of Japan Counterpart Application", dated Aug. 22, 2023, with English translation thereof, p. 1-p. 6.

*Primary Examiner* — Yung-Sheng M Tsui
(74) *Attorney, Agent, or Firm* — JCIPRNET

(57) ABSTRACT

A three-dimensional shape data generation apparatus includes: a processor configured to obtain three-dimensional shape data in which a three-dimensional shape is represented by plural three-dimensional elements and an attribute is assigned to each of the plural three-dimensional elements, and divide the three-dimensional shape into plural partial shapes according to the attributes to generate plural pieces of three-dimensional shape data.

11 Claims, 13 Drawing Sheets

(51) Int. Cl.
    *G06F 113/10*     (2020.01)
    *B33Y 50/02*     (2015.01)
    *B33Y 30/00*     (2015.01)
    *B33Y 10/00*     (2015.01)
    *B22F 10/18*     (2021.01)
    *B22F 10/28*     (2021.01)
    *B22F 12/55*     (2021.01)

(52) U.S. Cl.
    CPC ............... *B33Y 10/00* (2014.12); *B33Y 30/00* (2014.12); *B33Y 50/02* (2014.12); *G06F 2113/10* (2020.01)

(56) References Cited

U.S. PATENT DOCUMENTS

| | | | | |
|---|---|---|---|---|
| 2015/0351871 | A1* | 12/2015 | Chishti | A61C 7/002 |
| | | | | 425/150 |
| 2016/0144572 | A1* | 5/2016 | Elmieh | G06F 30/00 |
| | | | | 700/98 |
| 2017/0041479 | A1* | 2/2017 | Kubo | B33Y 30/00 |
| 2017/0372513 | A1* | 12/2017 | Zeng | G06T 17/00 |
| 2018/0319087 | A1* | 11/2018 | Eom | B29C 64/106 |
| 2019/0179288 | A1* | 6/2019 | Wike | B29C 64/386 |
| 2020/0098195 | A1* | 3/2020 | Jaiswal | G05B 13/0265 |
| 2021/0241525 | A1* | 8/2021 | Tanaka | B29C 64/386 |

FOREIGN PATENT DOCUMENTS

| | | |
|---|---|---|
| JP | 2010186479 | 8/2010 |
| JP | 2017159588 | 9/2017 |

\* cited by examiner

THREE-DIMENSIONAL SHAPE DATA GENERATION APPARATUS, THREE-DIMENSIONAL MODELING APPARATUS, AND NON-TRANSITORY COMPUTER READABLE MEDIUM STORING THREE-DIMENSIONAL SHAPE DATA GENERATION PROGRAM

CROSS-REFERENCE TO RELATED APPLICATIONS

This application is based on and claims priority under 35 USC 119 from Japanese Patent Application No. 2019-148917 filed Aug. 14, 2019.

BACKGROUND

(i) Technical Field

The present invention relates to a three-dimensional shape data generation apparatus, a three-dimensional modeling apparatus, and a non-transitory computer readable medium storing a three-dimensional shape data generation program.

(ii) Related Art

JP2017-159588A discloses a three-dimensional modeling data generation method executed by a computer, the method including: obtaining three-dimensional shape data of a modeling object representing a three-dimensional shape with a plurality of polygons; dividing the modeling object into a plurality of parts and processing three-dimensional shape data of the modeling object into three-dimensional shape data for each part; and generating three-dimensional modeling data for associating the three-dimensional shape data with data designating a type of a modeling material for each part.

JP2010-186479A discloses a three-dimensional model division method executed by a three-dimensional model division apparatus, the method including: detecting a plane in which triangles included in a three-dimensional model expressed by an input triangle mesh are connected to each other and normal directions of the triangles are common or opposite to each other are collected; extracting an outline graphic which is an outline of the three-dimensional model by connecting boundary edges belonging to only one triangle among sides of each triangle of a plane from the plane detected in the detecting, dividing the outline graphic extracted in the extracting into a plurality of child graphics which do not overlap with each other; and reconfiguring a three-dimensional entity each expressed by a triangular mesh for each child graphic divided in the dividing.

SUMMARY

Aspects of non-limiting embodiments of the present disclosure relate to a three-dimensional shape data generation apparatus, a three-dimensional modeling apparatus, and a non-transitory computer readable medium storing a three-dimensional shape data generation program capable of dividing a three-dimensional shape represented by a plurality of three-dimensional elements into a plurality of predetermined partial shapes.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a three-dimensional shape data generation apparatus including: a processor configured to obtain three-dimensional shape data in which a three-dimensional shape is represented by a plurality of three-dimensional elements and an attribute is assigned to each of the plurality of three-dimensional elements, and divide the three-dimensional shape into a plurality of partial shapes according to the attributes to generate a plurality of pieces of three-dimensional shape data.

BRIEF DESCRIPTION OF THE DRAWINGS

Exemplary embodiment(s) of the present invention will be described in detail based on the following figures, wherein.

DETAILED DESCRIPTION

Hereinafter, an exemplary embodiment of the present invention will be described in detail with reference to the accompanying drawings.

Figure 1:
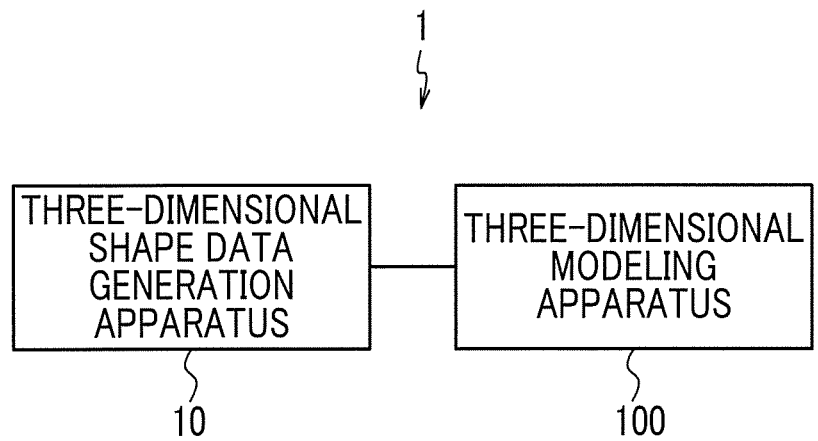
FIG. 1 is a configuration diagram of a three-dimensional modeling system.

FIG. 1 is a configuration diagram of a three-dimensional modeling system 1 according to the present exemplary embodiment. As illustrated in FIG. 1, the three-dimensional modeling system 1 includes a three-dimensional shape data generation apparatus 10 and a three-dimensional modeling apparatus 100.

Figure 2:
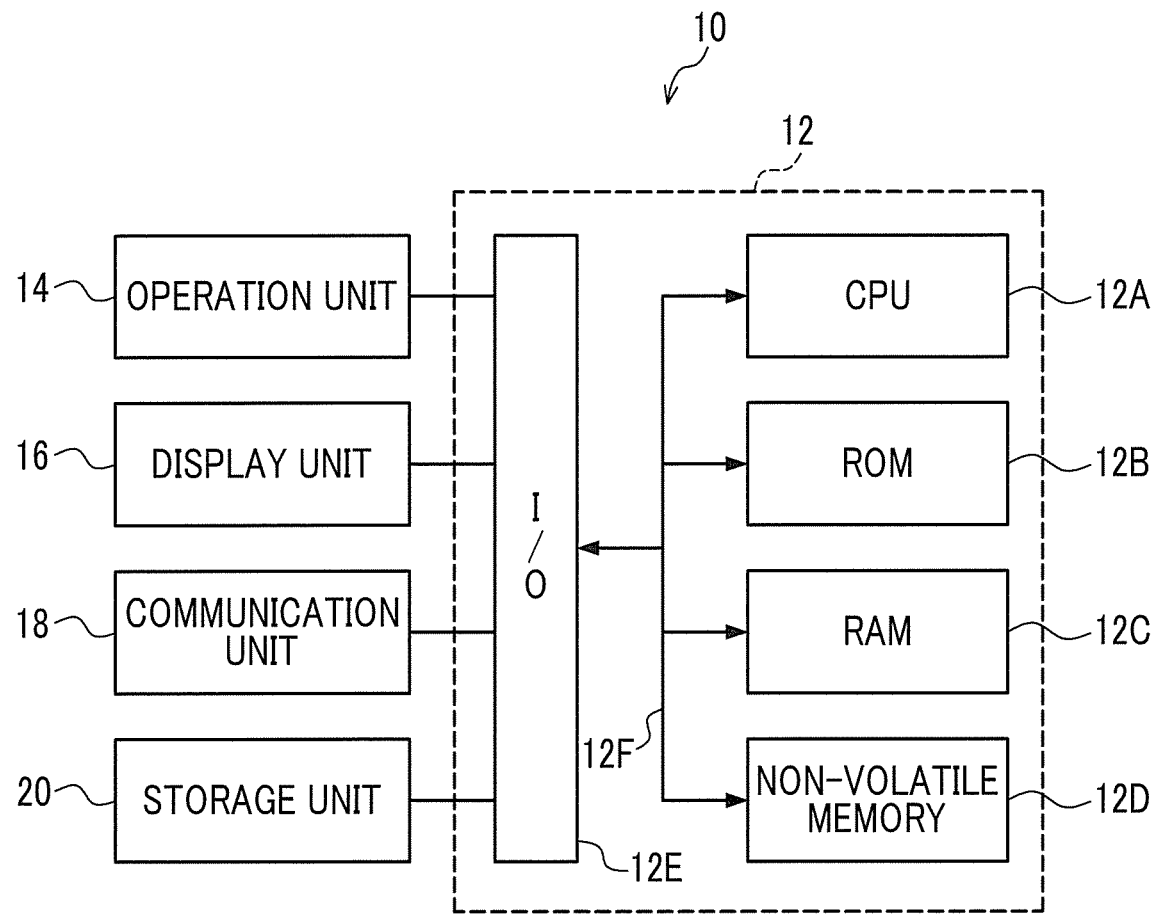
FIG. 2 is a configuration diagram of a three-dimensional shape data generation apparatus.

Next, a configuration of the three-dimensional shape data generation apparatus 10 according to the present exemplary embodiment will be described with reference to FIG. 2.

The three-dimensional shape data generation apparatus 10 is configured with, for example, a personal computer or the like and includes a controller 12. The controller 12 includes a central processing unit (CPU) 12A, a read only memory (ROM) 12B, a random access memory (RAM) 12C, a non-volatile memory 12D, and an input/output interface (I/O) 12E. The CPU 12A, the ROM 12B, the RAM 12C, the non-volatile memory 12D, and the I/O 12E are connected with one another via a bus 12F. The CPU 12A is an example of a processor.

In addition, an operation unit 14, a display 16, a communication unit 18, and a storage unit 20 are connected to the I/O 12E.

The operation unit 14 is configured to include a mouse, a keyboard, and the like, for example.

The display 16 is configured to include, for example, a liquid crystal display or the like.

The communication unit 18 is an interface for performing data communication with an external apparatus such as the three-dimensional modeling apparatus 100 or the like.

The storage unit 20 is configured by a non-volatile storage device such as a hard disc and stores a three-dimensional shape data generation program, three-dimensional shape data, and the like to be described below. The CPU 12A reads and executes the three-dimensional shape data generation program stored in the storage unit 20.

Next, a functional configuration of the CPU 12A will be described.

Figure 3:
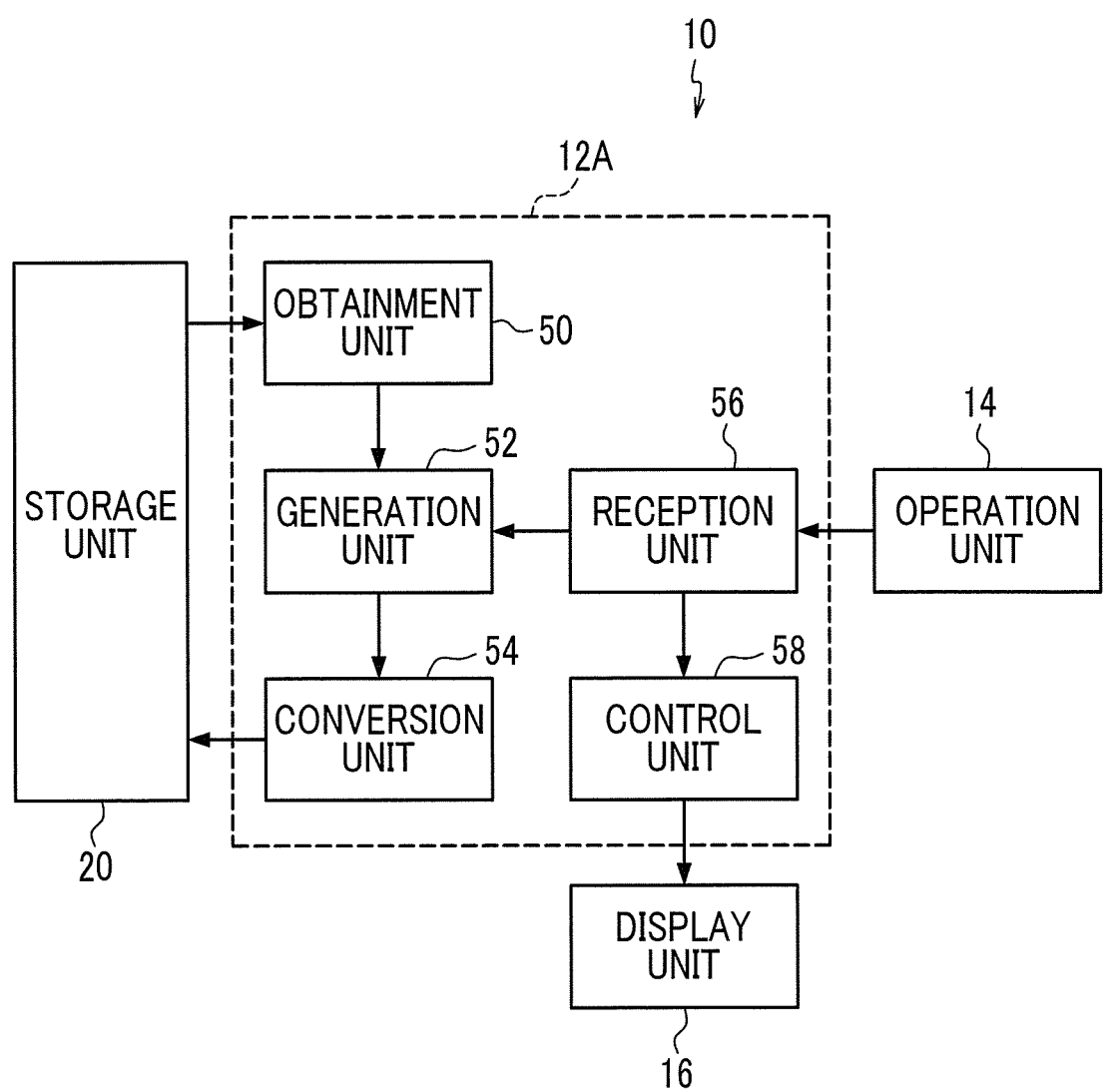
FIG. 3 is a block diagram illustrating a functional configuration of the three-dimensional shape data generation apparatus.

As illustrated in FIG. 3, the CPU 12A functionally includes an obtainment unit 50, a generation unit 52, a conversion unit 54, a reception unit 56, and a control unit 58.

The obtainment unit 50 obtains three-dimensional shape data which represents a three-dimensional shape with a plurality of voxels and in which an attribute is assigned to each of the plurality of voxels, that is, voxel data. The voxel is an example of a three-dimensional element. In addition, the attribute includes at least one attribute representing properties of a voxel such as the presence or absence of the voxel, a color, strength, and a material ratio, but a type of the attribute is not limited thereto.

The generation unit 52 generates a plurality of pieces of three-dimensional shape data by dividing the three-dimensional shape into a plurality of partial shapes according to an attribute.

The conversion unit 54 converts the three-dimensional shape data of the partial shape into mesh data by using a predetermined method. Here, the predetermined method is a method of converting voxel data into mesh data. The mesh data is data representing a three-dimensional shape with a plurality of meshes represented by polygons such as triangles. In the present exemplary embodiment, a case of using a marching cube method will be described as an example of the predetermined method, but the exemplary embodiment is not limited thereto. The marching cube method is a method of converting voxel data into mesh data by setting a predetermined plane according to a pattern of the presence or absence of voxels in a set of adjacent 8 voxels of 2×2×2.

In a case of converting three-dimensional shape data of a partial shape into mesh data by using the marching cube method, the conversion unit 54 sets a second surface representing a shape before division instead of a first surface set by the marching cube method, to a three-dimensional element which is not an edge before the division but becomes the edge after the division so as to convert voxel data into mesh data.

Further, the conversion unit 54 sets the first surface set by the marching cube method to a three-dimensional element which exists inside the three-dimensional shape before the division so as to convert voxel data into mesh data.

The reception unit 56 receives a threshold value for dividing the three-dimensional shape into the plurality of partial shapes according to the attribute assigned to the three-dimensional element. The generation unit 52 generates the plurality of pieces of three-dimensional shape data by dividing the three-dimensional shape into the plurality of partial shapes according to a comparison result of the attribute and the threshold value received by the reception unit 56. Further, the reception unit 56 receives a plurality of threshold values.

The control unit 58 displays a histogram of attribute values of attributes of a plurality of voxels representing the three-dimensional shape on the display 16. In this case, the reception unit 56 may receive a threshold value on the histogram. Further, the control unit 58 may display the threshold value on the histogram on the display 16.

Figure 4:
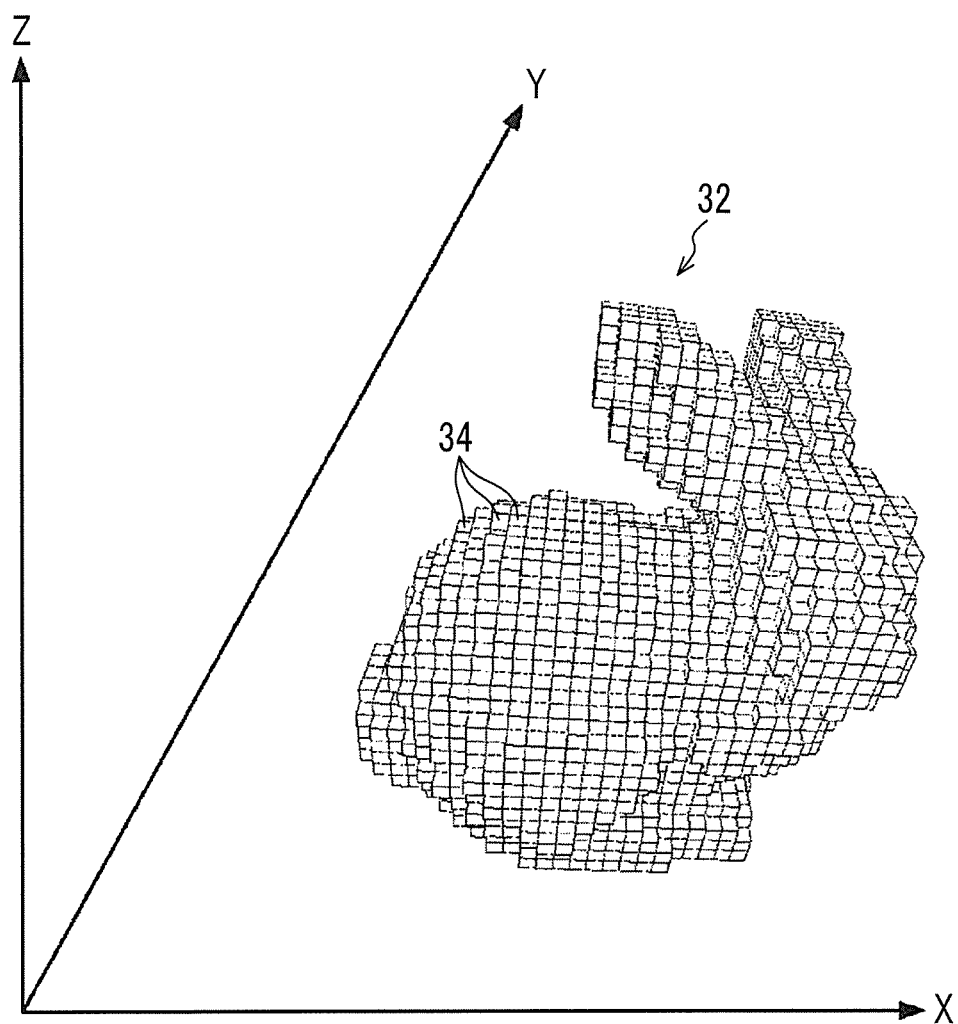
FIG. 4 is a diagram illustrating an example of a three-dimensional shape represented by voxel data.

FIG. 4 illustrates a three-dimensional shape 32 represented by three-dimensional shape data (voxel data) representing a three-dimensional shape as a set of voxels. As illustrated in FIG. 4, the three-dimensional shape 32 is configured by a plurality of voxels 34.

Here, the voxel 34 is a basic element of the three-dimensional shape 32 and for example, a rectangular parallelepiped is used, but the voxel 34 is not limited to the rectangular parallelepiped and a sphere, a cylinder, or the like may be used. By stacking the voxels 34, the required three-dimensional shape is expressed.

As a three-dimensional modeling method for modeling the three-dimensional shape, for example, a fused deposition modeling method (FDM) for modeling the three-dimensional shape by melting and a selective laser sintering method (SLS method) of modeling a three-dimensional shape by irradiating and sintering a powdered metal material with a laser beam, but another three-dimensional modeling method may be used. In the present exemplary embodiment, a case of modeling a three-dimensional shape by using the fused deposition modeling method will be described.

Next, a three-dimensional modeling apparatus of modeling a three-dimensional shape by using three-dimensional shape data generated by the three-dimensional shape data generation apparatus 10 will be described.

Figure 5:
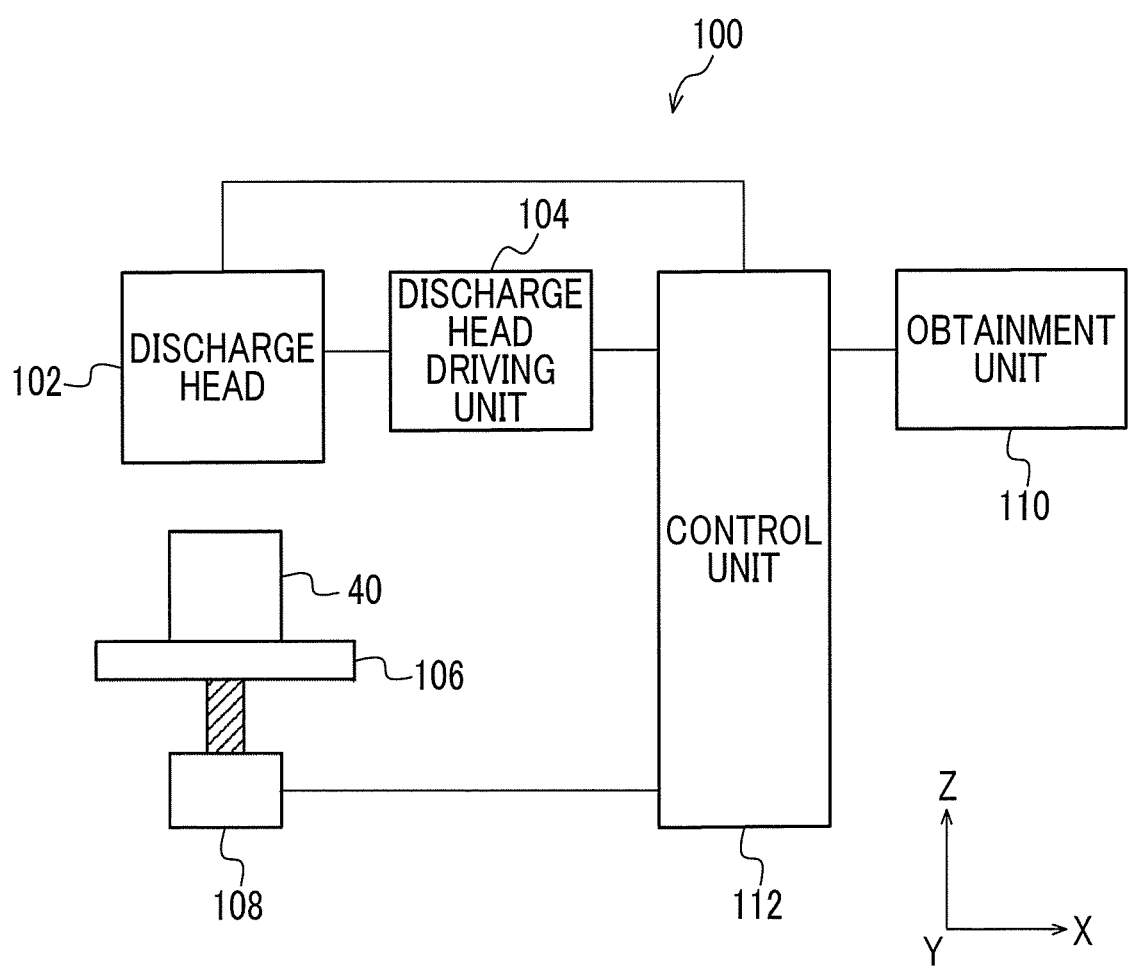
FIG. 5 is a configuration diagram of a three-dimensional modeling apparatus.

FIG. 5 illustrates a configuration of the three-dimensional modeling apparatus 100 according to the present exemplary embodiment. The three-dimensional modeling apparatus 100 is an apparatus which models a three-dimensional shape by the fused deposition modeling method.

As illustrated in FIG. 5, the three-dimensional modeling apparatus 100 includes a discharge head 102, a discharge head driving unit 104, a modeling table 106, a modeling table driving unit 108, an obtainment unit 110, and a control unit 112. The discharge head 102, the discharge head driving unit 104, the modeling table 106, and the modeling table driving unit 108 are examples of modeling units.

The discharge head 102 includes a modeling material discharge head of discharging a modeling material for modeling a three-dimensional shape 40 and a support material discharge head of discharging a support material. The support material is used for supporting an overhang portion (also referred to as "projecting portion") of the three-dimensional shape until modeling is completed and is removed after the modeling is completed.

The discharge head driving unit 104 drives the discharge head 102 and the discharge head 102 two-dimensionally performs scanning on an XY plane. Further, in some cases, the modeling material discharge head may include a plurality of discharge heads corresponding to modeling materials having a plurality of types of attributes (for example, colors).

The modeling table driving unit 108 drives the modeling table 106, and the modeling table 106 is moved up and down in the Z-axis direction.

The obtainment unit 110 obtains three-dimensional shape data and support material data generated by the three-dimensional shape data generation apparatus 10.

The control unit 112 causes the discharge head 102 to two-dimensionally perform scanning by driving the discharge head driving unit 104 and controls discharge of the modeling material and the support material by the discharge head 102 so that the modeling material is discharged according to the three-dimensional shape data obtained by the obtainment unit 110 and the support material is discharged according to the support material data.

In addition, every time the modeling of each layer is completed, the control unit 112 drives the modeling table driving unit 108 so as to lower the modeling table 106 by a predetermined lamination interval. Accordingly, a three-dimensional shape based on the three-dimensional shape data is modeled.

Figure 6:
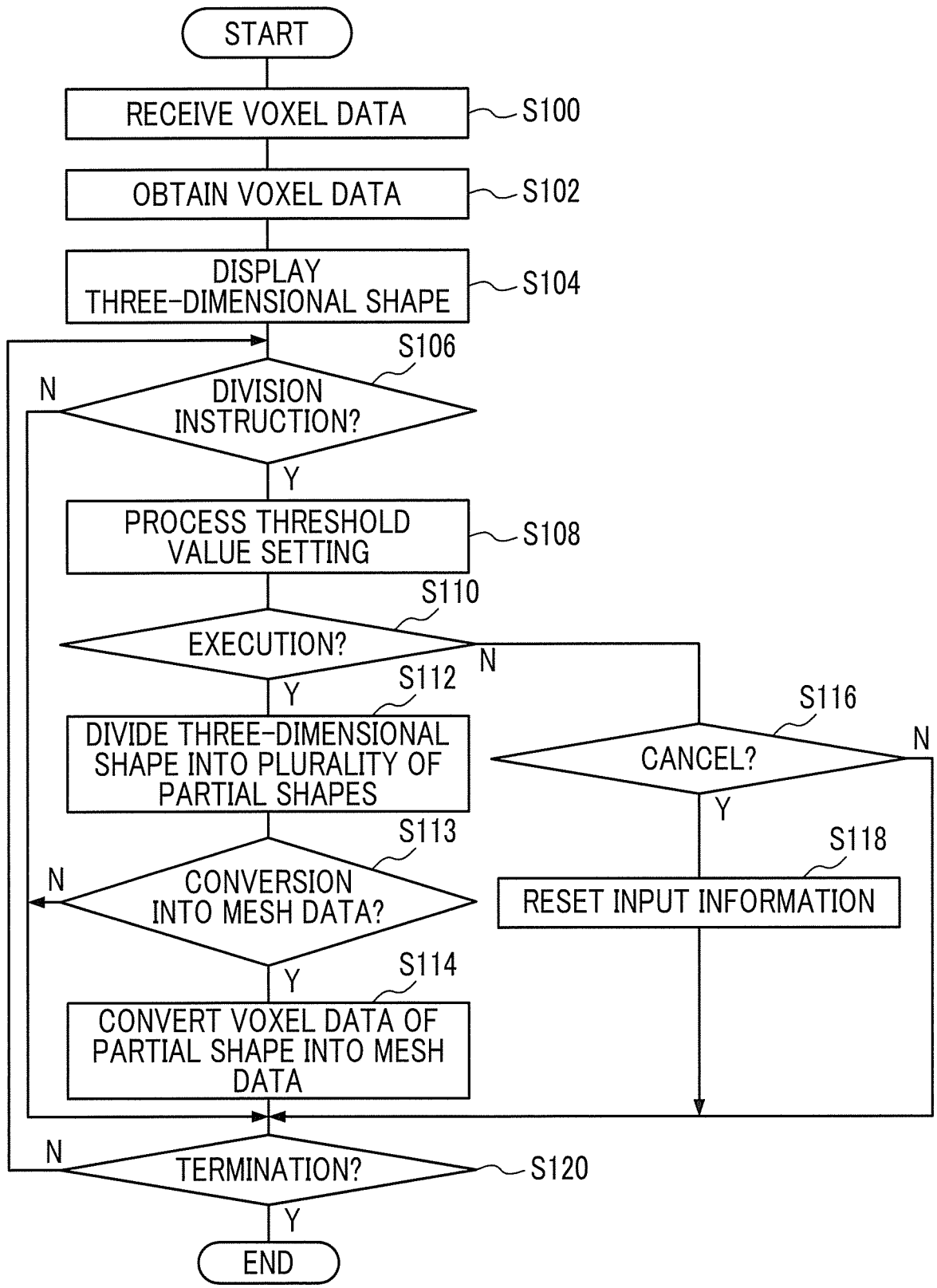
FIG. 6 is a flowchart illustrating a flow of a process by a three-dimensional shape data generation program.

Next, an action of the three-dimensional shape data generation apparatus 10 according to the present exemplary embodiment will be described with reference to FIG. 6. The CPU 12A executes a three-dimensional shape data generation program so as to execute a generation process illustrated in FIG. 6. The generation process illustrated in FIG. 6 is executed, for example, in a case where an operation of the user instructs to execute the generation program. In addition, in the present exemplary embodiment, description of the generation process on support material data is not repeated.

In step S100, the CPU 12A receives voxel data corresponding to a three-dimensional shape of a target to be modeled. For example, a reception screen for receiving the voxel data by an operation of the user is displayed on the display 16, the voxel data designated by the user is received.

In step S102, the CPU 12A obtains the voxel data received in step S100 by reading the voxel data from the storage unit 20, for example. The voxel data may be obtained from an external apparatus by communication via the communication unit 18. Further, the voxel data may be obtained by receiving mesh data in step S100 and converting the mesh data into the voxel data in step S102.

Figure 7:
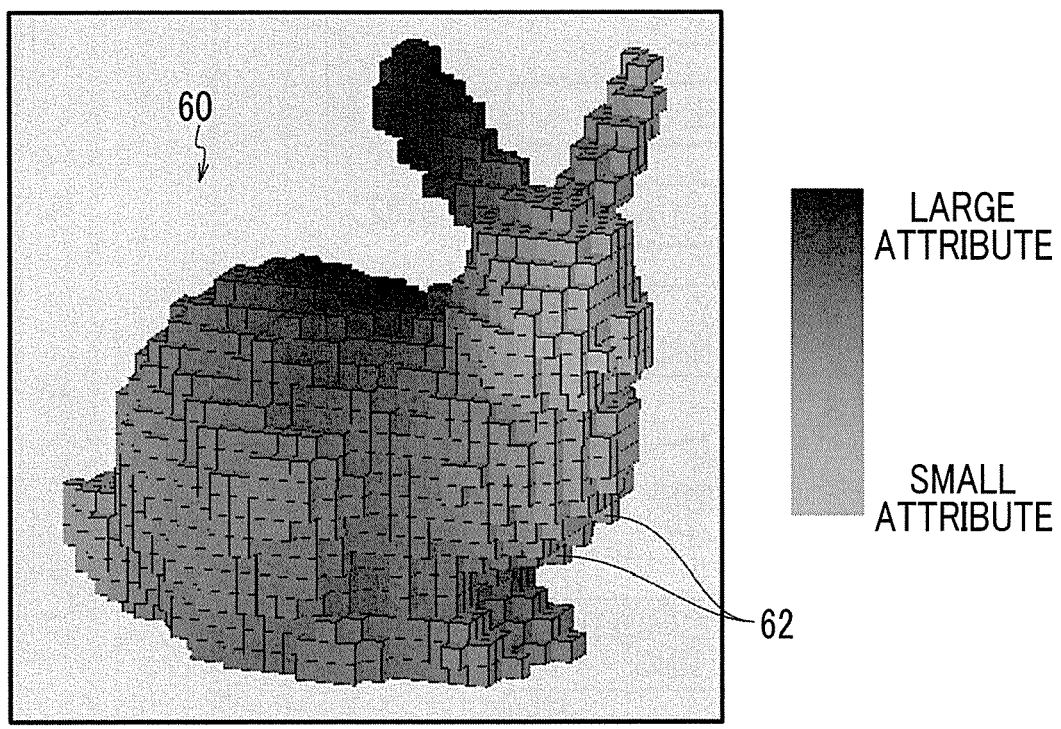
FIG. 7 is a diagram illustrating an example of displaying the three-dimensional shape.

In step S104, the CPU 12A generates display data of the three-dimensional shape from the voxel data obtained in step S102, and displays the display data on the display 16. At this time, as illustrated in FIG. 7, a size of an attribute value of an attribute set in each voxel 62 configuring a three-dimensional shape 60 is displayed in a manner being visually recognized. In the example in FIG. 7, the darker a color of the voxel, the larger the attribute value, and the lighter the color, the smaller the attribute value. For example, in a case where the attribute is strength, the darker the color of the voxel, the higher the strength, and the lighter the color, the lower the strength. Accordingly, it becomes easy to grasp the attribute value of the attribute set to each voxel.

In step S106, the CPU 12A determines whether or not an operation of the user instructs to divide the three-dimensional shape 60. In a case where the division is instructed, the process proceeds to step S108, and in a case where the division is not instructed, the process proceeds to step S120.

In step S108, a threshold value setting process of receiving and setting a threshold value for dividing the three-dimensional shape 60 from the user is executed. Specifically, first, a threshold value setting screen 64 illustrated in FIG. 8 is displayed on the display 16.

Figure 8:
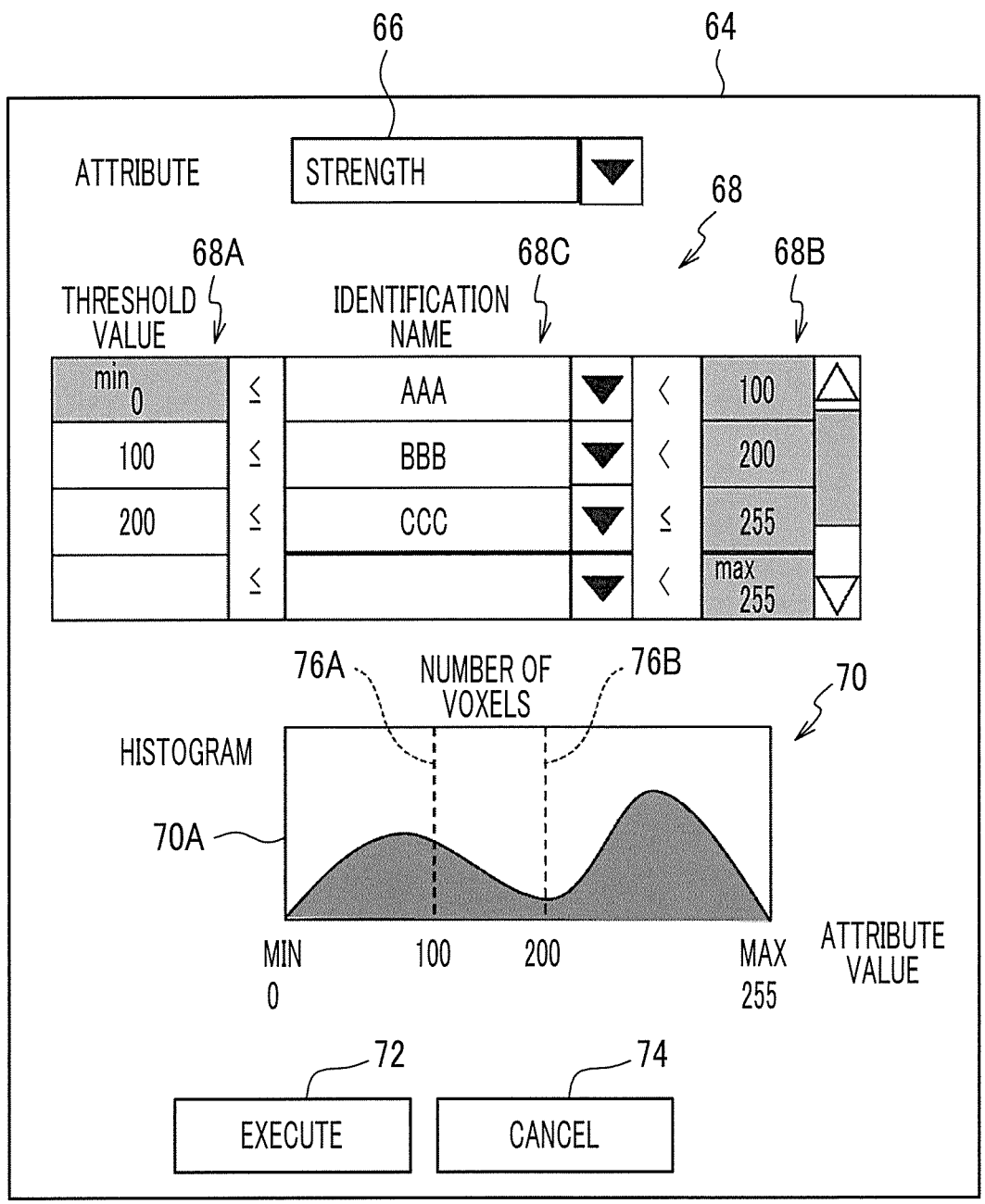
FIG. 8 is a diagram illustrating an example of a threshold value setting screen.

As illustrated in FIG. 8, the threshold value setting screen 64 is configured to include an attribute selection field 66 for setting an attribute, a threshold value setting field 68 for setting a threshold value, a histogram display region for displaying a histogram of an attribute value, an execution button 72 for instructing execution of the three-dimensional shape 60 being divided, and a cancel button 74 for canceling the execution of the division.

In the attribute selection field 66, for example, an attribute selected by the user from a list of attributes displayed by a pull-down menu or the like is displayed. In the example in FIG. 8, a case where strength is set as an attribute is illustrated. Hereinafter, the case where the strength is set as the attribute will be described.

The threshold value setting field 68 includes a lower limit value input field 68A for inputting a lower limit value of a threshold value, an upper limit value input field 68B for inputting an upper limit value of the threshold value, and an identification name input field 68C for inputting an identification name of identifying a partial shape obtained by dividing a three-dimensional shape. A plurality of lower limit value input fields 68A, upper limit value input fields 68B, and identification name input fields 68C are provided. That is, in the threshold value setting screen 64, it is possible to perform a setting of receiving a plurality of threshold values and dividing the three-dimensional shape 60 into partial shapes equal to or more than three.

The example in FIG. 8 represents a case where the selected strength can be a numerical value in a range of "0" to "255" which can be expressed by 8 bits. An identification name of "AAA" is set to a partial shape represented by a set of voxels having strength equal to or greater than a lower limit threshold value of "0" and less than an upper limit threshold value of "100". In addition, an identification name of "BBB" is set to a partial shape represented by a set of voxels having strength equal to or greater than a lower limit threshold value of "100" and less than an upper limit threshold value of "200". Further, an identification name of "CCC" is set to a partial shape represented by a set of voxels having strength equal to or greater than a lower limit threshold value of "200" and equal to or less than an upper limit threshold value of "255". That is, in this example, two threshold values of "100" and "200" are received, and the three-dimensional shape 60 is set to be divided into three partial shapes AAA, BBB, and CCC.

In the histogram display region 70, an attribute value of the set attribute, that is, a histogram 70A of a strength value is displayed. In the histogram 70A, a horizontal axis represents the strength value, and a vertical axis represents the number of voxels. At this time, the threshold values of "100" and "200" are displayed on the histogram 70A. Instead of directly inputting a threshold value in the lower limit value input field 68A and the upper limit value input field 68B, a position designated by the user on the horizontal axis of the histogram 70A may be set as the threshold value. For example, in a case where the user designates the attribute values of "100" and "200" on the horizontal axis of the histogram 70A, the values may be automatically input to the lower limit value input field 68A and the upper limit value input field 68B. For example, in a case where the user performs an operation of moving bars 76A and 76B indicating positions of the threshold values of "100" and "200" to the left and right along the horizontal axis, the threshold value may be automatically input into the lower limit value input field 68A and the upper limit value input field 68B in conjunction with this operation.

In the threshold value setting screen 64 illustrated in FIG. 8, the received attribute is only one, but a plurality of attributes may be received. In this case, for each attribute, a threshold value may be set and a histogram may be displayed.

In step S110, the CPU 12A determines whether or not the execution button 72 is selected. In a case where the execution button 72 is selected, the process proceeds to step S112, and in a case where the execution button 72 is not selected, the process proceeds to step S116.

In step S112, a plurality of pieces of voxel data are generated by dividing the three-dimensional shape 60 into a plurality of partial shapes according to a comparison result of the attribute value of the attribute for each voxel and the threshold value set in step S108. For example, as illustrated in FIG. 8, in a case where the threshold values of "100" and "200" are set, voxel data of a partial shape, to which the identification name of "AAA" is assigned, represented by a set of voxels having strength values equal to or greater than "0" and less than "100" is generated. In addition, voxel data of a partial shape, to which the identification name of "BBB" is assigned, represented by a set of voxels having strength values equal to or greater than "100" and less than the upper limit value of "200" is generated. Further, voxel data of a partial shape, to which the identification name of "CCC" is assigned, represented by a set of voxels having strength values equal to or greater than "200" and equal to less than "255" is generated. The generated voxel data is stored in the storage unit 20.

Figure 9:
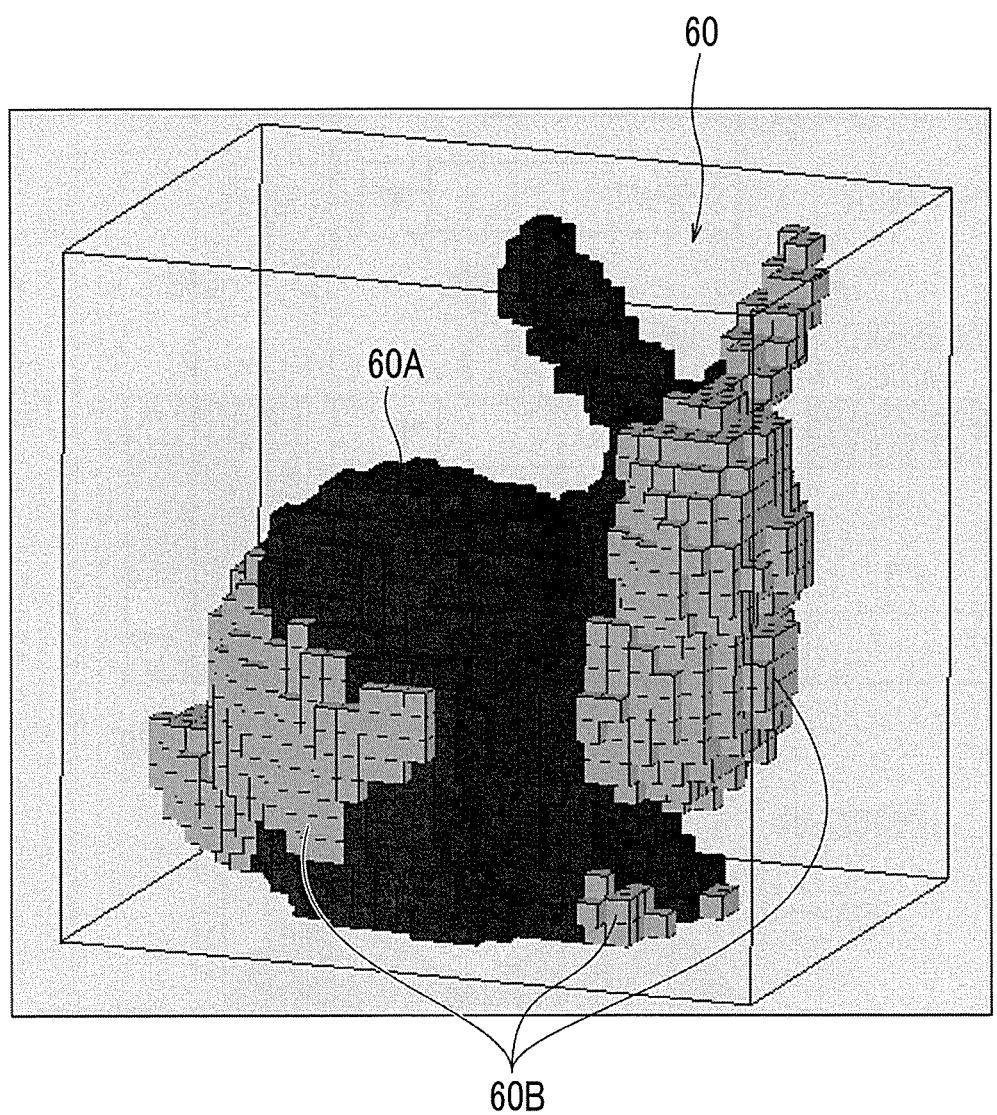
FIG. 9 is a diagram illustrating an example in which the three-dimensional shape is displayed in different colors according to a threshold value.
Figure 10:
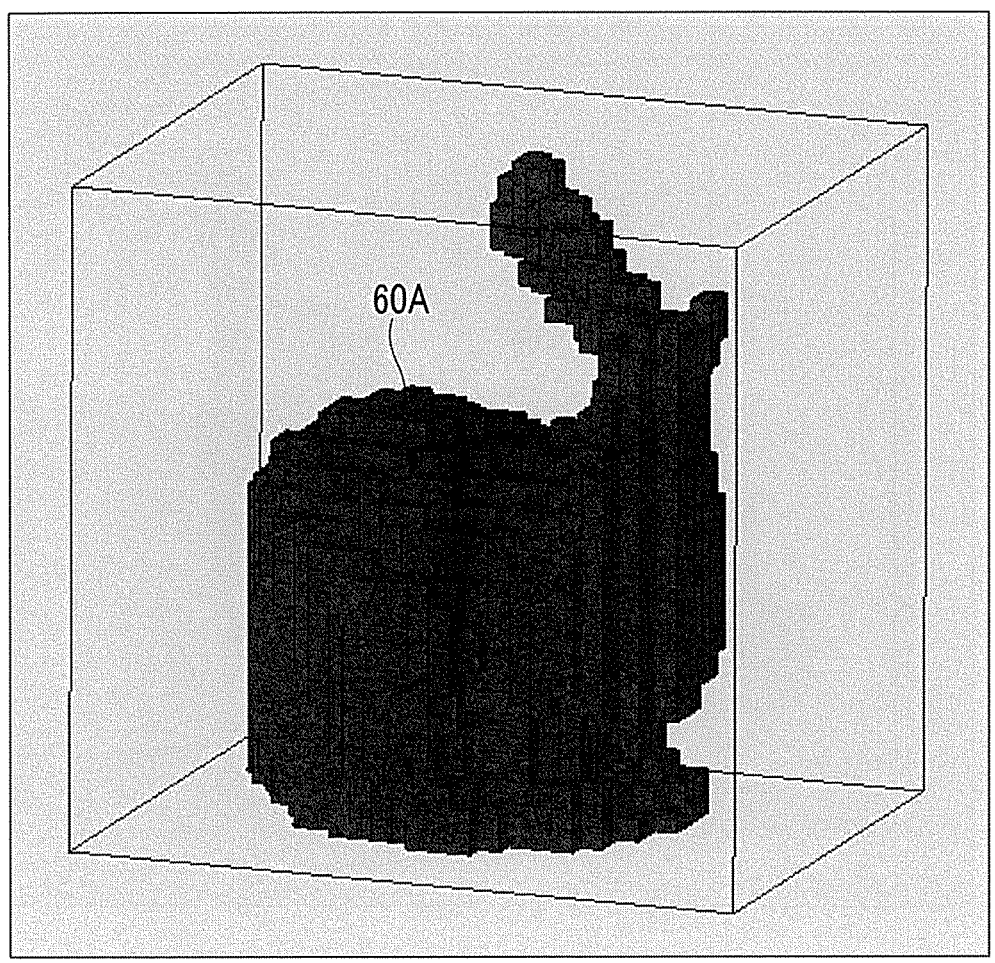
FIG. 10 is a diagram illustrating an example of a partial shape.
Figure 11:
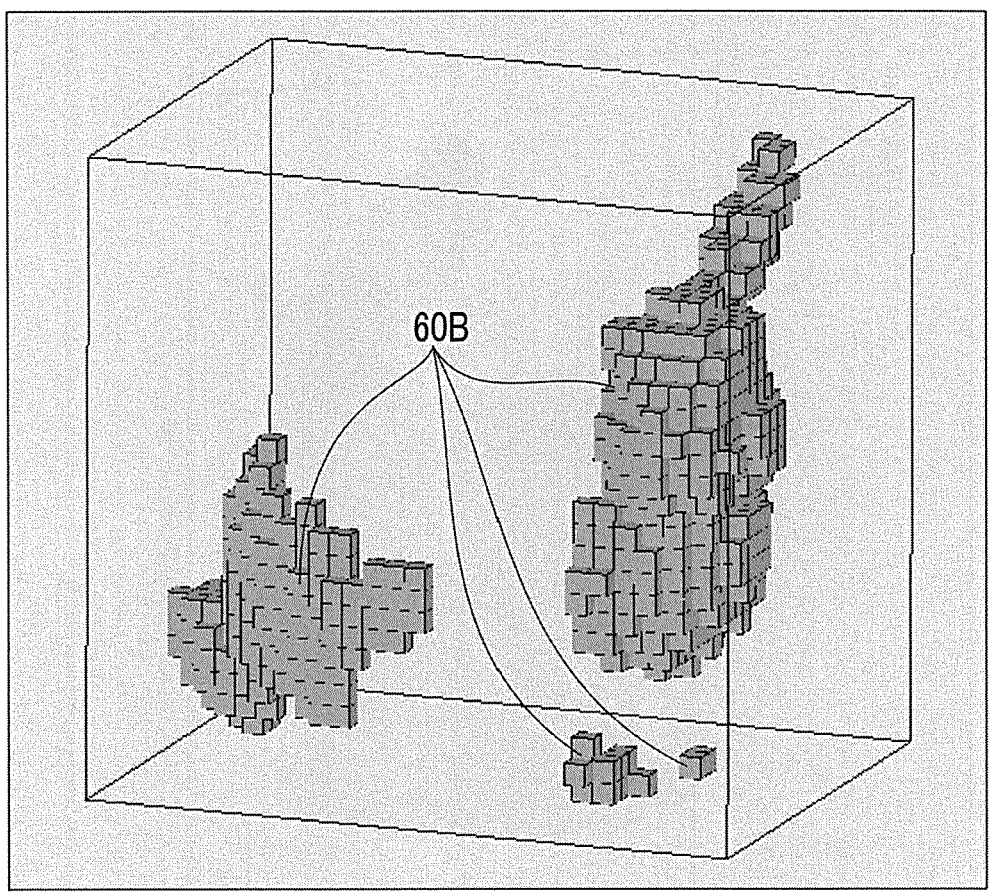
FIG. 11 is a diagram illustrating an example of another partial shape.

Further, FIG. 9 illustrates a partial shape 60A which is a set of voxels having strength values equal to or greater than a threshold value and a partial shape 60B which is a set of voxels having strength value less than the threshold value in different colors in a case where a median value of "127" in a range of "0" to "255" in which strength values can be set, as an example. FIG. 10 illustrates only the partial shape 60A, and FIG. 11 illustrates only the partial shape 60B.

In step S113, the CPU 12A displays a screen for the user to instruct whether or not to convert a plurality of pieces of divided voxel data into mesh data on the display 16, and it is determined whether or not the plurality of pieces of divided voxel data is converted into the mesh data according to the operation of the user. In a case where the conversion is instructed, the process proceeds to step S114, and in a case where the conversion is not instructed, the process proceeds to step S120.

In step S114, the CPU 12A converts the voxel data of each partial shape generated in step S112 into mesh data by using the marching cube method. In this case, by setting the second surface representing the shape before division instead of the first surface set by the marching cube method, to a voxel which is not an edge before the division but becomes the edge after the division, the voxel data is converted into mesh data. Here, the edge refers to a side in which an angle (0 to 360°) formed by two surfaces sharing a target side is outside a predetermined range (for example, 0 to 90° and 270 to 360°) on each side of a surface (mesh) configuring a three-dimensional shape represented by the mesh data.

Figure 12:
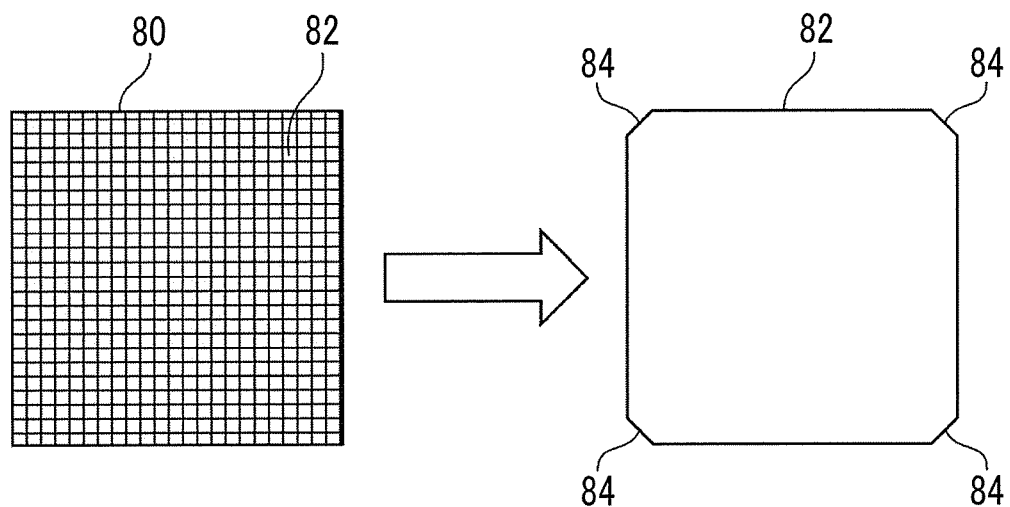
FIG. 12 is a diagram for explaining blunting of an edge portion.
Figure 13:
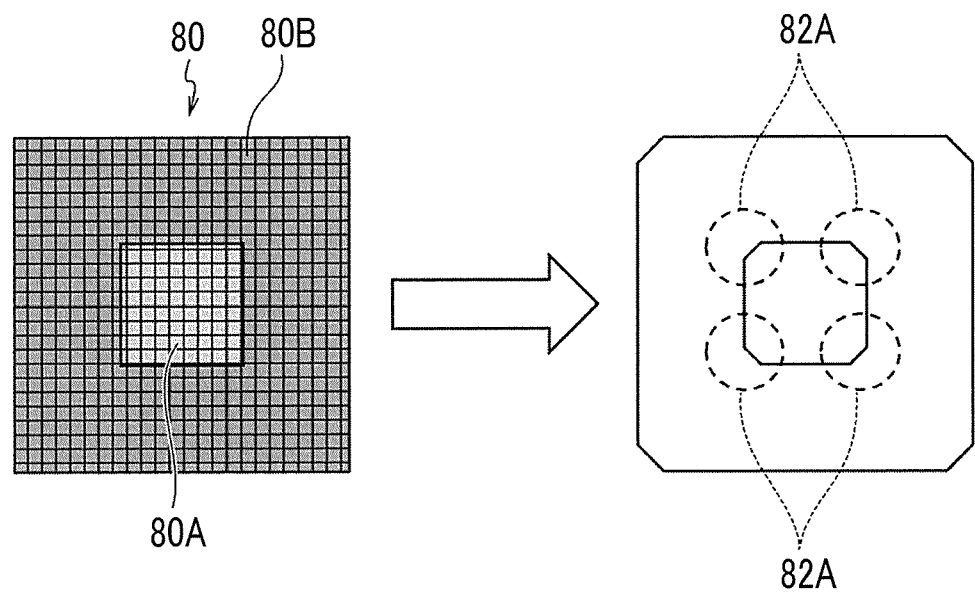
FIG. 13 is a diagram for explaining blunting of another edge portion.

Generally, in a case where voxel data in which a three-dimensional shape 80 in a rectangular parallelepiped shape illustrated in FIG. 12 is represented by a plurality of voxels 82 is converted into mesh data by using the marching cube method, a surface 84 predetermined by the marching cube method is set to the voxel 82 at an edge portion of the rectangular parallelepiped, so that a corner portion is removed and a diagonal shape is obtained in a case of being viewed from the side. That is, the edge portion becomes blunt. Meanwhile, it is assumed that the three-dimensional shape 80 illustrated in FIG. 12 is divided into an inner rectangular parallelepiped partial shape 80A and an outer partial shape 80B including the partial shape 80A as illustrated in FIG. 13. In this case, since a boundary portion between the partial shape 80A and the partial shape 80B is originally inside the three-dimensional shape 80, in a case where the partial shape 80A is converted into mesh data, an edge portion in a corner portion 82A becomes blunt and an edge portion on an inner surface of the partial shape 80B also becomes blunt, so that there is no gap at the boundary portion between the partial shape 80A and the partial shape 80B, and there is no particular problem.

In this manner, in a case of using the marching cube method, the edge portion of the voxel which is not an edge before the division but becomes the edge after the division becomes blunt, the second surface representing the shape before the division is set instead of the first surface set by the marching cube method.

Figure 14:
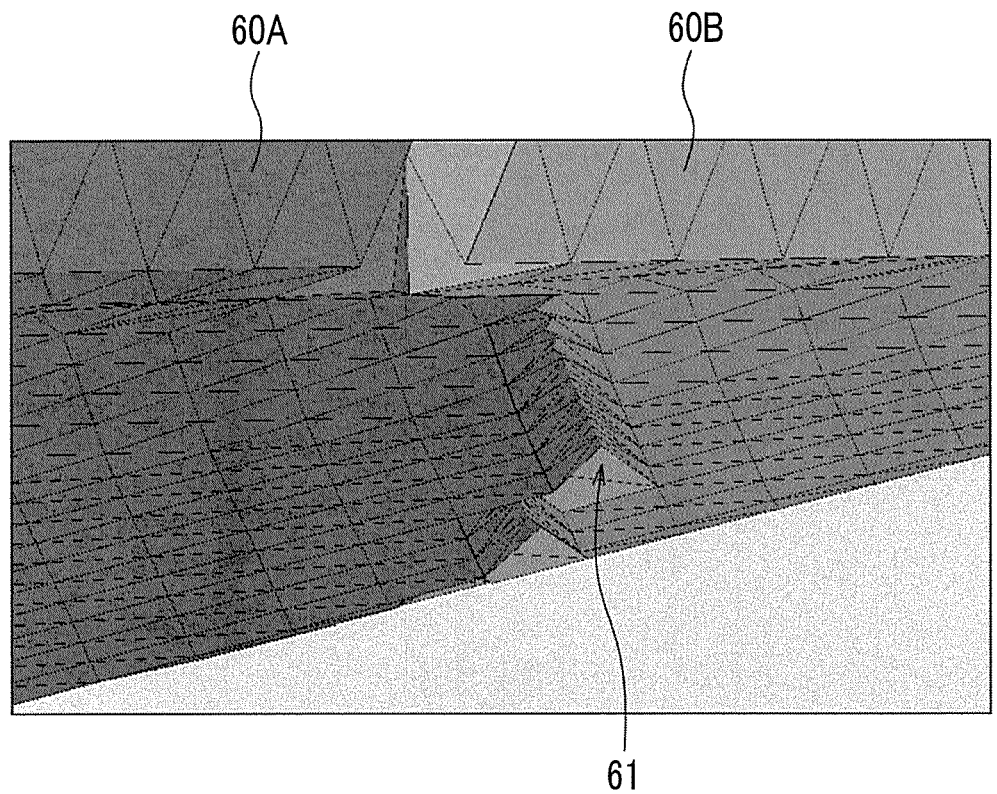
FIG. 14 is a diagram for explaining a groove generated in a case where the partial shape is converted into mesh data.
Figure 15:
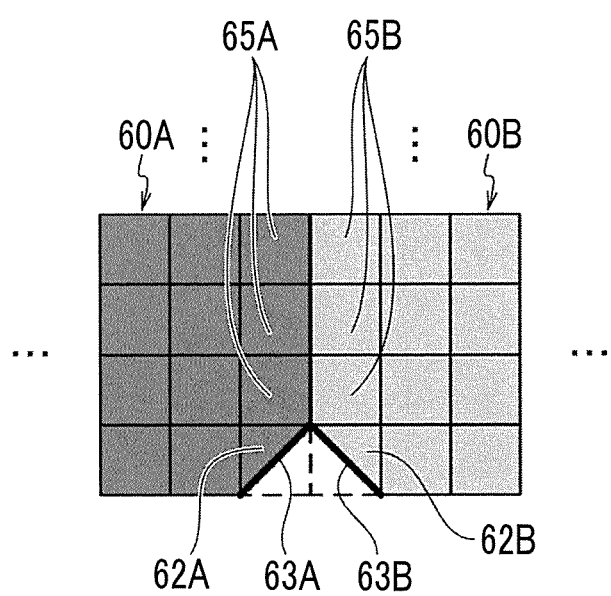
FIG. 15 is a diagram for explaining a first surface set by a marching cube method.

FIG. 14 illustrates an enlarged view of a part of a bottom surface after the three-dimensional shape 60 illustrated in FIG. 9 is divided into partial shapes 60A and 60B and converted into mesh data. As illustrated in FIG. 14, a groove 61 is generated at a boundary portion between the partial shape 60A and the partial shape 60B after conversion into mesh data. FIG. 15 is a diagram illustrating the groove 61 in FIG. 14 as viewed from the side of the three-dimensional shape 60.

As illustrated in FIG. 15, a voxel 62A of the partial shape 60A is a voxel which is not an edge before division but becomes the edge after the division. In the same manner, a voxel 62B of the partial shape 60B is a voxel which is not an edge before division but becomes the edge after the division. That is, the voxels 62A and 62B are voxels in portions having changed shapes before and after the division.

Figure 16:
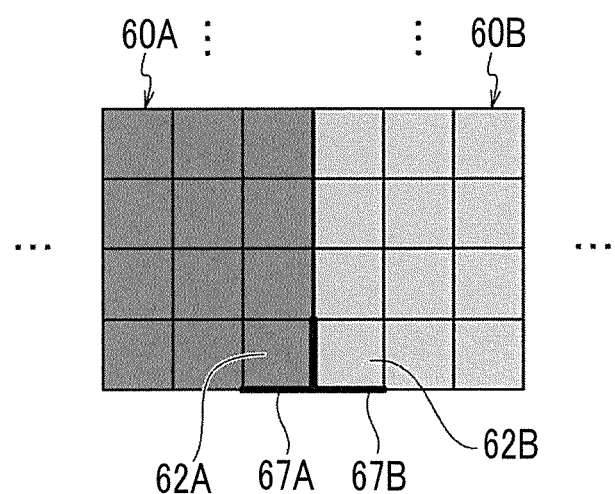
FIG. 16 is a diagram for explaining a second surface representing a shape before division.

Accordingly, in a case where voxel data of the partial shapes 60A and 60B is converted into mesh data, the first surfaces 63A and 63B predetermined by the marching cube method are set to the voxels 62A and 62B, so that an edge portion becomes blunt and changes from the original shape. Therefore, as illustrated in FIG. 16, for the voxels 62A and 62B, the second surfaces 67A and 67B representing the shapes before the division are respectively set to the voxels 62A and 62B. Accordingly, in a case where the voxel data of the partial shapes 60A and 60B after the division is converted into mesh data, blunting of the edge portion is suppressed, and a gap generated between the partial shapes 60A and 60B is suppressed.

On the other hand, setting the first surface set by the marching cube method to the voxel which exists inside the three-dimensional shape 60 before the division, voxel data is converted into mesh data. In other words, the second surface representing the shape before the division is not set to the voxel which exists inside the three-dimensional shape 60 before the division. For example, since the voxels 65A and 65B in FIG. 15 are voxels which exist inside the three-dimensional shape 60 before the division, the second surface is not set and the first surface set by the marching cube method is set.

In step S116, the CPU 12A determines whether or not the cancel button 74 is selected. In a case where the cancel button 74 is selected, the process proceeds to step S118, and in a case where the cancel button 74 is not selected, the process proceeds to step S120.

In step S118, the CPU 12A resets information input on the threshold value setting screen 64.

In step S120, the CPU 12A determines whether or not to terminate the present routine. For example, it is determined whether or not to terminate this routine by determining whether or not an operation of closing the screen is performed. In a case where it is determined that this routine is to be terminated, this routine is terminated, and in a case where it is determined that this routine is not to be terminated, the process proceeds to step S106 and the processes described above are repeated.

In this manner, in the present exemplary embodiment, a plurality of pieces of three-dimensional shape data is generated by dividing a three-dimensional shape into a plurality of partial shapes according to an attribute. Further, in a case of converting three-dimensional shape data of the partial shape into mesh data by using the marching cube method, the second surface representing a shape before division instead of the first surface set by the marching cube method is set to a voxel which is not an edge before the division but becomes the edge after the division so as to convert voxel data into mesh data. For this reason, it is suppressed that the shape changes before and after a division.

Next, a case of modeling a three-dimensional shape based on three-dimensional shape data generated by the three-dimensional shape data generation apparatus 10 will be described.

The obtainment unit 110 of the three-dimensional modeling apparatus 100 obtains voxel data or mesh data transmitted from the three-dimensional shape data generation apparatus 10. Further, the control unit 112 causes the discharge head 102 to two-dimensionally perform scanning by driving the discharge head driving unit 104 and controls discharge of a modeling material and a support material by the discharge head 102 so that the modeling material is discharged according to the voxel data or the mesh data obtained by the obtainment unit 110. Accordingly, the three-dimensional shape is modeled.

Although the present exemplary embodiment of the invention is described by using each of the exemplary embodiments, the present exemplary embodiment of the invention is not limited to the scope described in each of the exemplary embodiments. Various modifications or improvements can be added to each of the exemplary embodiments without departing from the gist of the present exemplary embodiment of the invention and the modified or improved form is also included in the technical scope of the present exemplary embodiment of the invention.

For example, in the present exemplary embodiment, a case where the three-dimensional shape data generation apparatus 10 which generates three-dimensional shape data and the three-dimensional modeling apparatus 100 which models a three-dimensional shape based on the three-dimensional shape data are separately configured, is described, but the three-dimensional generation apparatus 100 may be configured with the function of the three-dimensional shape data generation apparatus 10.

That is, the obtainment unit 110 of the three-dimensional modeling apparatus 100 may obtain the voxel data and the control unit 112 executes the generation process in FIG. 6 so as to generate three-dimensional shape data.

In the embodiments above, the term "processor" refers to hardware in a broad sense. Examples of the processor includes general processors (e.g., CPU: Central Processing Unit), dedicated processors (e.g., GPU: Graphics Processing Unit, ASIC: Application Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

Further, in the present exemplary embodiment, a form in which the three-dimensional shape data generation program is installed in the storage unit 20 is described, but the exemplary embodiment is not limited thereto. The three-dimensional shape data generation program according to the present exemplary embodiment also may be provided to be recorded in a computer readable storage medium. For example, which the three-dimensional shape data generation program according to the present exemplary embodiment of the invention may be provided by being recorded on an optical disc such as a compact disc (CD)-ROM, a digital versatile disc (DVD)-ROM, and the like or by being recorded in a semiconductor memory such as a universal serial bus (USB) memory, a memory card, and the like. In addition, the three-dimensional shape data generation program according to the present exemplary embodiment may be obtained from an external apparatus via the communication line connected to the communication unit 18.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A three-dimensional shape data generation apparatus comprising:
   a processor configured to
      obtain three-dimensional shape data in which a three-dimensional shape is represented by a plurality of voxels and a property of the voxels is assigned to each of the plurality of three-dimensional voxels, wherein the three-dimensional data is associated with an object to be outputted and the object has the three-dimensional shape,
      divide the three-dimensional shape into a plurality of partial shapes according to a threshold value of the property of the voxels to generate a plurality of pieces of three-dimensional shape data,
      wherein the processor is configured to divide the three-dimensional shape into the plurality of partial shapes according to the threshold value of the property of the voxels to generate the plurality of pieces of three-dimensional shape data comprising:
         receive an upper threshold value and a lower threshold value, and divide the three-dimensional shape into a plurality of partial shapes according to a comparison result of attribute values of the property of the voxels and the upper threshold value and the lower threshold value to generate the plurality of pieces of three-dimensional shape data, and convert the three-dimensional shape data of a partial shape of the plurality of partial shapes into mesh data by removing a corner portion of a voxel within the partial shape.

2. The three-dimensional shape data generation apparatus according to claim 1, wherein the processor is further configured to convert three-dimensional shape data of the partial shape into the mesh data by using a predetermined method, wherein the processor is further configured to convert the three-dimensional shape data of the partial shape into the mesh data by using the predetermined method comprising:

the processor sets a second surface representing a shape of the three-dimensional shape data of the partial shape before the partial shape is divided from the three-dimensional shape instead of a first surface set by the predetermined method, to a voxel which is not an edge before the division but becomes the edge after the division to convert the three-dimensional shape data of the partial shape into the mesh data.

3. The three-dimensional shape data generation apparatus according to claim 2, wherein the processor sets the first surface set by the predetermined method to a three-dimensional voxel which exists inside the three-dimensional shape before the division to perform conversion into the mesh data.

4. The three-dimensional shape data generation apparatus according to claim 1, wherein the processor receives a plurality of the threshold values comprising the upper threshold value and the lower threshold value.

5. The three-dimensional shape data generation apparatus according to claim 1, wherein the processor receives a plurality of the threshold values comprising the upper threshold value and the lower threshold value.

6. The three-dimensional shape data generation apparatus according to claim 2, wherein the processor receives a plurality of the threshold values comprising the upper threshold value and the lower threshold value.

7. The three-dimensional shape data generation apparatus according to claim 1,
wherein the processor causes the display to display the threshold value on the histogram.

8. A three-dimensional modeling apparatus comprising:
a modeling unit configured to model a three-dimensional shape based on three-dimensional shape data generated by the three-dimensional shape data generation apparatus according to claim 1.

9. A non-transitory computer readable medium storing a three-dimensional shape data generation program causing a computer to execute a process, the process comprising:
obtaining three-dimensional shape data in which a three-dimensional shape is represented by a plurality of voxels and a property of the voxels is assigned to each of the plurality of three-dimensional voxels, wherein the three-dimensional data is an object to be outputted and the object has the three-dimensional shape, dividing the three-dimensional shape into a plurality of partial shapes according to a threshold value of the property of voxels to generate a plurality of pieces of three-dimensional shape data, wherein the process of dividing the three-dimensional shape into the plurality of partial shapes according to the threshold value of the property of the voxels to generate the plurality of pieces of three-dimensional shape data comprising:

receiving an upper threshold value and a lower threshold value, and divide the three-dimensional shape into a plurality of partial shapes according to a comparison result of attribute values of the property of the voxels and the upper threshold value and the lower threshold value to generate the plurality of pieces of three-dimensional shape data, and converting the three-dimensional shape data of a partial shape of the plurality of partial shapes into mesh data by removing a corner portion of a voxel within the partial shape.

10. The three-dimensional shape data generation apparatus according to claim 1, wherein the attribute value is one of a color, a material strength, and a material ratio associated with a material of the object to be outputted.

11. The three-dimensional shape data generation apparatus according to claim 1, wherein the processor is configured to provide a user interface for changing the threshold value by changing the position of the threshold value indicated on the histogram.

* * * * *